UNITED STATES PATENT OFFICE.

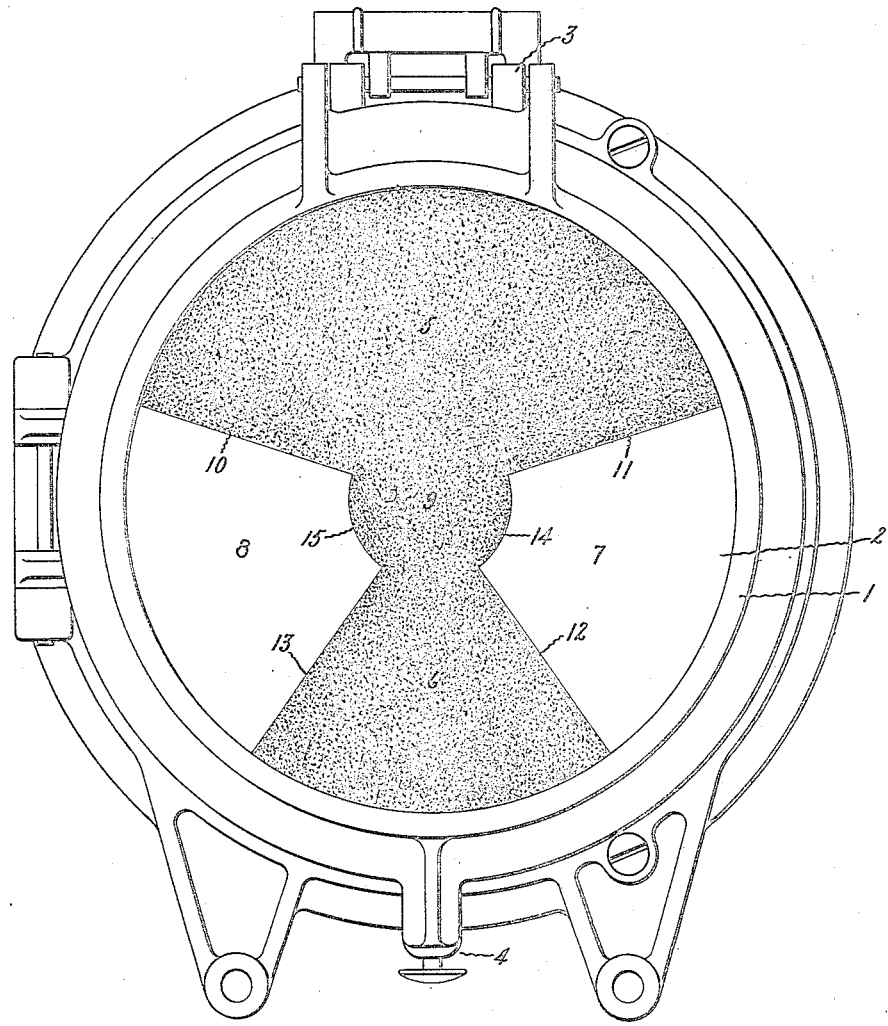

CHARLES E. HARTHAN, OF LYNN, MASSACHUSETTS, ASSIGNOR TO GENERAL ELECTRIC COMPANY, A CORPORATION OF NEW YORK.

HEADLIGHT FOR VEHICLES.

1,246,093.      Specification of Letters Patent.      Patented Nov. 13, 1917.

Application filed April 22, 1916. Serial No. 92,838.

*To all whom it may concern:*

Be it known that I, CHARLES E. HARTHAN, a citizen of the United States, residing at Lynn, in the county of Essex, State of Massachusetts, have invented certain new and useful Improvements in Headlights for Vehicles, of which the following is a specification.

My invention has reference to improvements in headlights for vehicles in which the source of light is located in or near the focus of a parabolic or similarly shaped reflector and which is provided with a door of glass or other transparent material closing the front opening of the reflector. The object of the invention is to avoid the glare from the light striking any point above the level of the source and particularly the eye of the drivers of other vehicles running in the opposite direction, or the eyes of foot-passengers. Numerous devices designed for this object have failed in their purpose because they either dimmed the light to a degree that prevented the driver of the vehicle from seeing the road sufficiently far ahead and sufficiently to the right and to the left to enable him to safely guide the vehicle to avoid accidents, or else they did not prevent the glare in all directions above the level of the source, particularly near the edges of the road at or about the curbs or the ditches which generally line ordinary highways. By my invention these defects are avoided in a cheap and efficacious manner.

The invention consists, broadly speaking, in a door of glass or other transparent material applied to the front edge of the reflector of the headlight and having its surface rendered translucent as distinguished from transparent over such portions as would otherwise emit the glare from the light upwardly, either by direct rays from the source or by reflection; while other portions of the glass are left transparent in such positions as to illuminate the road to the right and left of the line of travel by reflection from the reflector without however throwing the image of the source of light into the eye of the observer, no matter whether the latter is approaching the headlight directly in front or is crossing the road anywhere in front of the vehicle.

In the accompanying drawing the preferred embodiment of my invention is illustrated by a front view of the headlight window, but I desire it to be understood, and it will be readily understood by those skilled in the art, that numerous modifications can be made without departing from my invention.

The headlight window is shown as a frame 1, having a plate of glass or other transparent material 2 secured to it. This frame may conveniently have a hinge 3 by which it may be secured to the front part of the headlight and a latch or similar device 4 for securing the window when it is swung in position to close the opening of the headlight. The glass 2 may be either plain or curved, as usual, or it may be shaped to form a lens, but a plain sheet of glass answers all purposes quite well. This glass has an extensive portion dimmed by grinding, sand-blasting, etching, or by opalizing, and this part of the glass window is indicated in the drawing by granular shading. The dimmed portion of the glass preferably is a sector 5 above the center, covering about $\frac{2}{5}$ of the circumference, and below the center there is another sector 6 covering about $\frac{1}{5}$ of the circumference, while to the right and to the left of these dimmed sectors there are two transparent sectors 7, 8 each covering about $\frac{1}{5}$ of the circumference; and the two dimmed sectors are joined by a central circular portion 9 which is of such size that it covers the source of light from any point of view above the level of the source in front of the headlight. The different sectors are in the embodiment of the invention here shown marked off from each other by the radial lines 10, 11, 12, 13 and the central portion is marked off from the transparent sectors by the circular curves 14 and 15.

With this arrangement it has been found that the light passing through the dimmed portions is diffused but is sufficiently thrown ahead of the car to enable the operator to clearly see the road in front along the line of travel and to be well seen from a considerable distance without glare, while through the transparent portions 7, 8 the light is thrown a considerable distance ahead to the right and to the left of the line of travel, but the source of light is seen neither directly nor by reflection.

Altogether my invention contemplates and secures the dimming of the light from the center, from a large part above the center and from a smaller part below the center, while permitting the light to issue undimmed from two diametrically opposite sides of the headlight; but the dimmed central portion is sufficiently large to prevent a view of the source of light either directly or by reflection from any point above the level of the source. It will be readily understood that the object of my invention can also be gained when the dimmed and clear portions of the glass are not sectoral in shape. In fact, any configuration of the limiting lines 10, 11, 12, 13, 14 and 15 will serve the purpose of the invention, so long as the upper, central and lower portions of the dimmed glass are sufficiently extensive to obstruct a view of the source of light either directly or by reflection, while the two lateral portions permit the light to issue freely.

What I claim as new and desire to secure by Letters Patent of the United States, is:—

1. A headlight window of glass or other like material having the center and radial sections above and below the center extending to the periphery of the window rendered translucent and two diametrically opposite lateral portions transparent, substantially as described.

2. A glass window for a headlight having two sectors above and below the center and the central portion itself rendered translucent as distinguished from transparent, and two transparent sectors one to the right and the other to the left of the center.

3. A glass window for a headlight having two diametrically opposite lateral portions transparent to permit the free issue of light to two sides of the road ahead and all other parts translucent for the diffused illumination of the road ahead in the line of travel, and intercepting direct or reflected rays in that line.

In witness whereof, I have hereunto set my hand this twentieth day of April, 1916.

CHARLES E. HARTHAN.